United States Patent
He

(10) Patent No.: US 11,589,311 B2
(45) Date of Patent: Feb. 21, 2023

(54) METHOD AND APPARATUS FOR DETERMINING TIME-FREQUENCY RESOURCE, CHIP AND COMPUTER PROGRAM

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/340,541

(22) Filed: Jun. 7, 2021

(65) Prior Publication Data

US 2021/0297954 A1    Sep. 23, 2021

Related U.S. Application Data

(63) Continuation of application No. PCT/CN2018/122651, filed on Dec. 21, 2018.

(51) Int. Cl.
*H04W 72/04* (2009.01)
*H04W 52/02* (2009.01)
*H04W 76/28* (2018.01)

(52) U.S. Cl.
CPC ..... *H04W 52/0235* (2013.01); *H04W 72/042* (2013.01); *H04W 76/28* (2018.02)

(58) Field of Classification Search
CPC ..... H04W 52/02; H04W 72/04; H04W 76/28; H04W 52/0235; H04W 72/042
See application file for complete search history.

(56) References Cited

U.S. PATENT DOCUMENTS

| 2018/0270756 A1 | 9/2018 | Bhattad et al. |
| 2018/0332533 A1 | 11/2018 | Bhattad et al. |
| 2019/0182702 A1* | 6/2019 | Wang ................ H04W 72/1268 |
| 2019/0199503 A1* | 6/2019 | Son ....................... H04L 5/0053 |

(Continued)

FOREIGN PATENT DOCUMENTS

| CN | 103636264 A | 3/2014 |
| CN | 105992362 A | 10/2016 |

(Continued)

OTHER PUBLICATIONS

3GPP TS 38.331 V15.2.1 (Jun. 2018)—3rd Generation Partnership Project; Technical Specification Group Radio Access Network; NR; Radio Resource Control (RRC) protocol specification (Release 15) (303 pages).

(Continued)

*Primary Examiner* — Chi Ho A Lee
(74) *Attorney, Agent, or Firm* — Perkins Coie LLP

(57) ABSTRACT

Disclosed are a method and an apparatus for determining a time-frequency resource, a chip, and a computer program. The method includes: a terminal device acquires power-saving related configurations; the terminal device determines a time-frequency resource for receiving an energy-saving channel/signal according to the relationship between the power-saving related configurations or power-saving related configuration parameters and the time-frequency resource for the energy-saving channel/signal.

25 Claims, 3 Drawing Sheets

(56) References Cited

U.S. PATENT DOCUMENTS

| | | | | |
|---|---|---|---|---|
| 2020/0037396 | A1* | 1/2020 | Islam | H04W 76/27 |
| 2020/0092814 | A1* | 3/2020 | Zhou | H04W 80/02 |
| 2020/0100179 | A1* | 3/2020 | Zhou | G06F 1/3209 |
| 2020/0107265 | A1* | 4/2020 | Hwang | H04W 52/0216 |
| 2020/0128427 | A1* | 4/2020 | Hwang | H04W 72/048 |
| 2020/0150736 | A1* | 5/2020 | Nam | G06F 1/325 |
| 2020/0178172 | A1* | 6/2020 | Thangarasa | H04W 52/02 |
| 2020/0186991 | A1* | 6/2020 | He | H04W 52/0212 |
| 2020/0196242 | A1* | 6/2020 | Hoglund | H04W 52/0229 |
| 2020/0245395 | A1* | 7/2020 | Zhang | H04L 5/0053 |
| 2021/0153189 | A1* | 5/2021 | Jo | H04W 72/0493 |
| 2021/0176710 | A1* | 6/2021 | Tooher | H04W 72/1289 |
| 2021/0204214 | A1* | 7/2021 | Chang | H04W 52/0229 |
| 2021/0259044 | A1* | 8/2021 | Islam | H04W 52/0229 |
| 2021/0297987 | A1* | 9/2021 | Hwang | H04W 68/02 |
| 2021/0298090 | A1* | 9/2021 | Myung | H04W 74/0833 |

FOREIGN PATENT DOCUMENTS

| | | |
|---|---|---|
| CN | 107360619 A | 11/2017 |
| JP | 2020534729 A | 11/2020 |
| WO | 2018169649 A1 | 9/2018 |
| WO | 2018203717 A1 | 11/2018 |
| WO | 2019055417 A1 | 3/2019 |
| WO | 2019182428 A1 | 9/2019 |

OTHER PUBLICATIONS

3GPP TSG RAN WG1 Meeting #90—R1-1712800—Prague, Czechia, Aug. 21-25, 2017—Qualcomm Incorporated, Efficient monitoring of DL control channels (10 pages).
3GPP TSG-RAN WG2 Meeting #99—R2-1708301—Berlin, Germany, Aug. 21-25, 2017—Huawei, HiSilicon, Neul, Power saving signal or channel in NB-IoT (4 pages).
International Search Report dated Sep. 5, 2019 of PCT/CN2018/122651 (4 pages).
Extended European Search Report for European Application No. 18943434.3 dated Nov. 5, 2021. 9 pages.
Samsung "Evaluation Methodology" 3GPP TSG RAN WG1 Meeting #94bis; R1-1810891 Chengdu, China, Oct. 8-12, 2018. 10 pages.
First Examination Report of the Indian application No. 202117029194, dated Mar. 9, 2022. 6 pages with English Translation.
CMCC, Considerations on power saving signal design, 3GPP TSG RAN WGI Meeting #95, R1-1812890, Spokane USA, Nov. 12-16, 2018, 6 pages.
CMCC, Discussion on CSI report enhancement for CDRX, 3GPP TSG RAN WG1 Meeting #95, R1-1812891, Spokane, USA, Nov. 12-16, 2018, 5 pages.
First Examination Report dated Jun. 15, 2022 in EP Application No. 189434343, 8 pages.
Notice of Reasons for Refusal of the Japanese application No. 2021-534920, dated Jun. 24, 2022. 11 pages with English Translation.
ZTE, Considerations on triggering for UE power saving, 3GPP TSG RAN WG1 Meeting #95, R1-1812422, Spokane, USA, Nov. 12-16, 2018. 7 pages.
First Office Action for Chinese Application No. 202110477349.4 dated Aug. 12, 2022. 59 pages with English translation.
Examination Report for European Application No. 18943434.3 dated Nov. 30, 2022. 6 pages.
Second Office Action for Chinese Application No. 202110477349.4 dated Oct. 24, 2022. 44 pages with English translation.

* cited by examiner

US 11,589,311 B2

METHOD AND APPARATUS FOR DETERMINING TIME-FREQUENCY RESOURCE, CHIP AND COMPUTER PROGRAM

CROSS-REFERENCE TO RELATED APPLICATION

The present application is a continuation application of International PCT Application No. PCT/CN2018/122651, filed on Dec. 21, 2018, the entire content of which is hereby incorporated by reference.

TECHNICAL FIELD

The present disclosure relates to wireless network technologies, in particular to a method for determining a time-frequency resource, an apparatus, a chip and a computer program.

BACKGROUND

In the 5G evolution technology, higher requirements are put forward for power saving of a terminal device (User Equipment, UE). Therefore, a concept of power-saving channel/signal, such as PWSS (Power Saving Signal), is introduced. The terminal device can receive a power-saving channel/signal on a time-frequency resource of the power-saving channel/signal, and use the power-saving channel/signal for power-saving control. At present, there is no effective way for determining the time-frequency resource of the power-saving channels/signal.

SUMMARY

In view of this, implementations of the present disclosure provide a method for determining a time-frequency resource, an apparatus, a chip and a computer program.

In a first aspect, a method for determining a time-frequency resource is provided, which includes:

acquiring, by a terminal device, a power-saving related configuration; and determining, by the terminal device, a time-frequency resource for receiving a power-saving channel/signal according to a relationship between the power-saving related configuration or a power-saving related configuration parameter and the time-frequency resource of the power-saving channel/signal.

In a second aspect, a method for determining a time-frequency resource is provided, which includes:

configuring, by a network side, a power-saving related configuration, wherein there is a relationship between the power-saving related configuration or a power-saving related configuration parameter and a time-frequency resource of a power-saving channel/signal, and the relationship is used for determining a time-frequency resource for receiving the power-saving channel/signal.

In a third aspect, an apparatus for determining a time-frequency resource is provided, which is configured to perform the method in the above first aspect and various implementation modes of the first aspect.

Specifically, the apparatus for determining a time-frequency resource includes function modules for performing the method in the above first aspect and various implementation modes of the first aspect.

In a fourth aspect, an apparatus for determining a time-frequency resource is provided, which is configured to perform the method in the above second aspect and various implementation modes of the second aspect.

Specifically, the apparatus for determining a time-frequency resource includes function modules for performing the method in the above second aspect and various implementation modes of the second aspect.

In a fifth aspect, a communication device is provided, which includes a processor and a memory, wherein the memory is configured to store a computer program, and the processor is configured to call and run the computer program stored in the memory to perform the method in any one of the above first to second aspects or in various implementation modes thereof.

In a sixth aspect, a chip is provided, which is configured to implement the method in any one of the above first to second aspects or in various implementation modes thereof.

Specifically, the chip includes a processor configured to call and run a computer program from a memory, such that a device in which the chip is installed performs the method in any one of the above first to second aspects or in various implementation modes thereof.

In a seventh aspect, a computer-readable storage medium is provided, which is configured to store a computer program, wherein the computer program enables a computer to perform the method in any one of the above first to second aspects or in various implementation modes thereof.

In an eighth aspect, a computer program product is provided, which includes computer program instructions that enable a computer to perform the method in any one of the above first to second aspects or in various implementation modes thereof.

In a ninth aspect, a computer program is provided, which, when being run on a computer, enables the computer to perform the method in any one of the above first to second aspects or in various implementation modes thereof.

Based on the above introduction, it can be seen that by adopting the solution described in the present disclosure, the terminal device can determine the time-frequency resource for receiving the power-saving channel/signal according to the relationship between the power-saving related configuration or the power-saving related configuration parameter and the time-frequency resource of the power-saving channel/signal, so that the terminal device can accurately receive the power-saving channel/signal and realize an effective power-saving control.

DETAILED DESCRIPTION

Technical solutions in implementations of the present disclosure will be described below with reference to the drawings in the implementations of the present disclosure. Apparently, that the implementations described are just some of the implementations of the present disclosure, but not all of the implementations of the present disclosure. Based on the implementations in the present disclosure, all other implementations obtained by those of ordinary skill in the art without paying an inventive effort shall fall within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
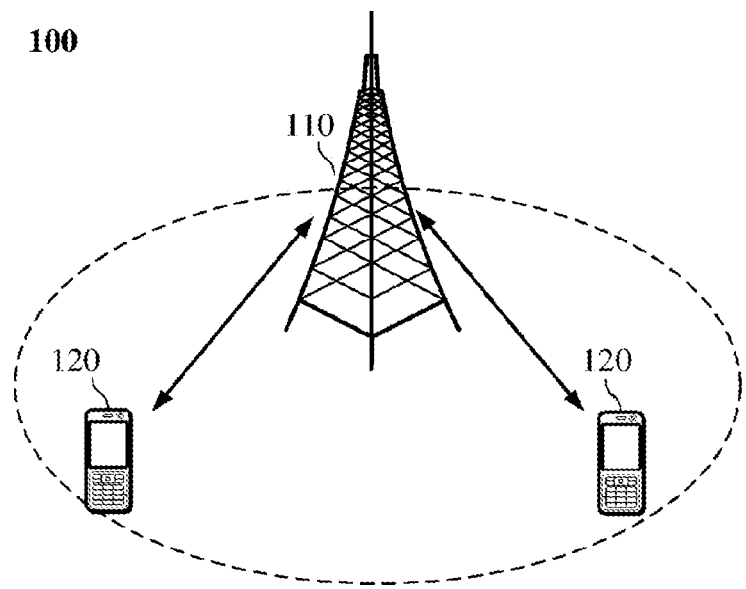
FIG. 1 is a schematic diagram of an architecture of a communication system according to an implementation of the present disclosure.

Illustratively, FIG. 1 is a schematic diagram of an architecture of a communication system according to an implementation of the present disclosure. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. The "terminal device" as used herein includes, but is not limited to, a device configured to receive/send communication signals via a wired circuit, for example, via a public switched telephone network (PSTN), a digital subscriber line (DSL), a digital cable, a direct cable; and/or via another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone; a personal communication system (PCS) terminal capable of combining a cellular wireless telephone with data processing, facsimile, and data communication abilities; a personal digital assistant (PDA) that may include a radio telephone, a pager, internet/intranet access, a Web browser, a memo pad, a calendar, a Global Positioning System (GPS) receiver; and a conventional laptop and/or palmtop receiver or other electronic devices including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, a device to device (D2D) communication may be performed between the terminal devices 120.

Optionally, a 5G system or a 5G network may also be referred to as an NR system or an NR network.

The technical solution of the implementations of the present disclosure may be applied to both unlicensed spectrum and licensed spectrum, and this is not restricted in the implementations of the present disclosure.

FIG. 1 illustrates schematically one network device and two terminal devices. Optionally, the wireless communication system 100 may include multiple network devices, and other quantities of terminal devices may be included within the coverage area of each network device, and this is not restricted in the implementations of the present disclosure.

Optionally, the communication system 100 may include other network entities, such as a network controller and a mobile management entity, and this is not restricted in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described repeatedly herein. The communication device may also include other devices in the communication system 100, such as other network entities, for example, a network controller and a mobile management entity, and this is not restricted in the implementations of the present disclosure.

It should be understood that the terms "system" and "network" may often be used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "I" have an "or" relation.

In order to achieve a purpose of power saving, it is commonly needed to consider the power saving of a terminal device in the following dimensions.

From the dimension of time domain, reducing the time for turning on the receiver by the terminal device can reduce the power consumption of the terminal device. In the current Discontinuous Reception (DRX) mechanism, in each DRX ON (activation) duration, the terminal device needs to constantly detect a Physical Downlink Control Channel (PDCCH) to determine whether a base station schedules data transmission sent to the terminal device. However, most terminal devices may not need to receive data transmission for a long time, but they still need to keep a regular wake-up mechanism to monitor possible downlink transmission. For such type of terminal devices, a power-saving channel/signal, such as a PWSS, may be introduced to indicate whether the terminal device needs to wake up in the DRX ON duration before the start of the DRX ON duration, thus the power consumption of the terminal device caused by unnecessary reception may be reduced.

Figure 2:
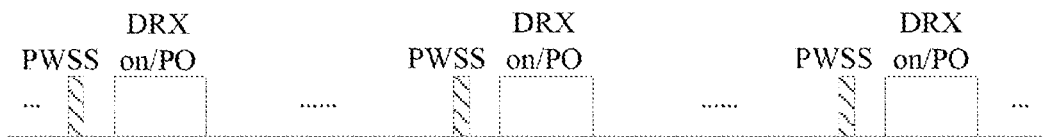
FIG. 2 is a schematic diagram of a PWSS according to an implementation of the present disclosure.

FIG. 2 is a schematic diagram of a PWSS according to an implementation of the present disclosure. As shown in FIG. 2, if a base station determines that a terminal device needs to be scheduled in the DRX on duration, the base station may send a PWSS to the terminal device before the DRX on duration to wake up the terminal device. Otherwise, the base station may not send the PWSS to the terminal device. After detecting the PWSS, the terminal device will perform a PDCCH detection and data reception in the DRX on duration, otherwise it may not perform the PDCCH detection. Similarly, for a case that a terminal device in RRC idle (Radio Resource Control idle) state receives a paging message, whether the PDCCH detection is needed in this Paging Occasion (PO) may be determined by detecting a PWSS before the PO.

From the dimension of frequency domain, reducing a receiving bandwidth of the terminal device is of great significance to power saving, by matching the received bandwidth quickly with the traffic volume of the terminal device, the effect of power saving can be achieved. For example, switching between BandWidth Parts (BWPs) or activation and deactivation of a carrier can be performed quickly according to the traffic volume of the terminal device, the receiving bandwidth of the terminal device can be reduced quickly when the traffic volume is low, thus achieving the purpose of power saving.

From the dimensions of processing time and complexity, when the base station schedules the terminal device to receive downlink data, Downlink Control Information (DCI) schedules a Physical Downlink Shared CHannel (PDSCH) of this time slot and PDSCH across time slots for receiving, which requires different processing times of the terminal device. The different requirements on the processing time of the terminal device are also reflected in the different requirements on a delay for feeding back Hybrid Automatic Repeat reQuest-Ack (HARQ-ACK) by the terminal device and a delay of uplink scheduling. If the requirement on the processing time of the terminal device can be reduced, the purpose of power saving can be achieved. Other configurations that can affect the processing complexity of the terminal device and thus affect the power consumption also include Multiple-Input Multiple-output configuration (MIMO configuration), MIMO layers configuration, antenna configuration, Channel State Information (CSI) report configuration, Radio Resource Management (RRM) measurement configuration, etc.

From the dimension of PDCCH reception, PDCCH monitoring is the main source of the power consumption of the terminal device, and reducing the PDCCH monitoring is of great significance to power saving of terminal device. The main ways include: triggering PDCCH monitoring by defining a PWSS; stopping the PDCCH monitoring by defining a Go-to-sleep (GTS) signal; and changing or turning on/off a control resource set (CORSET) or a searchSpace of the terminal device dynamically or semi-statically through signaling, etc.

Figure 3:
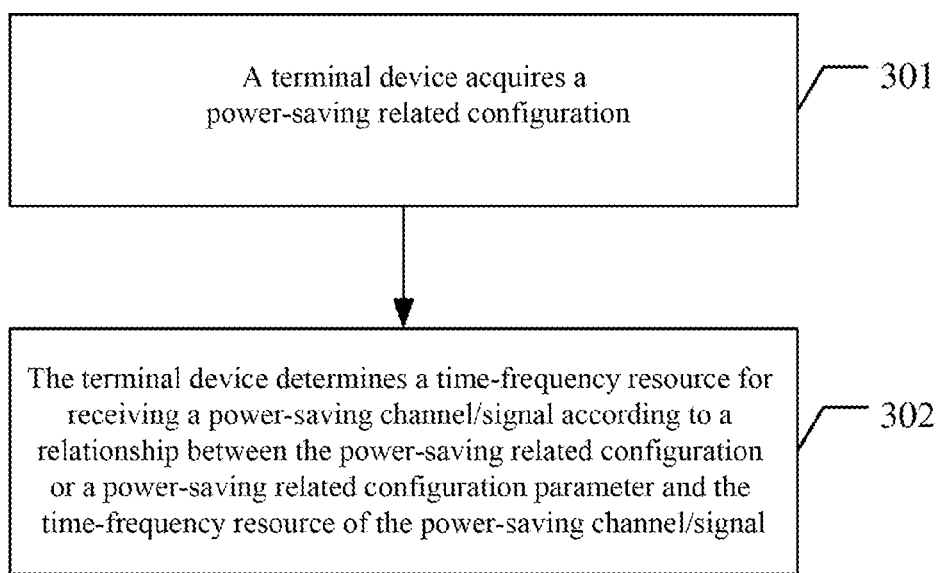
FIG. 3 is a schematic flow chart of a method for determining a time-frequency resource according to an implementation of the present disclosure.

Based on the above considerations for power saving, the present disclosure proposes a method for determining a time-frequency resource of a power-saving channel/signal. FIG. 3 is a schematic flow chart of a method for determining a time-frequency resource according to an implementation of the present disclosure. As shown in FIG. 3, following specific implementation modes are included.

In 301, a terminal device acquires a power-saving related configuration.

In 302, the terminal device determines a time-frequency resource for receiving a power-saving channel/signal according to a relationship (which may also be called a correspondence relation, etc.) between the power-saving related configuration or a power-saving related configuration parameter and the time-frequency resource of the power-saving channel/signal.

Preferably, the power-saving related configuration may include a DRX configuration, and/or a BWP configuration, and/or a PDCCH CORSET configuration, and/or a PDCCH searchSpace configuration, and/or a MIMO configuration, and/or a MIMO layers configuration, and/or an antenna configuration, and/or a CSI report configuration, and/or an RRM measurement configuration, etc.

The terminal device may also acquire the time-frequency resource of the power-saving channel/signal in addition to the power-saving related configuration. There is a relationship between the power-saving related configuration or the power-saving related configuration parameter and the time-frequency resource of the power-saving channel/signal, and the relationship can be acquired by terminal device. The power-saving related configuration, the time-frequency resource of the power-saving channel/signal and the relationship may all be configured by a network side.

Preferably, the power-saving related configuration parameter may include part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration, etc.

The terminal device may determine the time-frequency resource for receiving the power-saving channel/signal according to the configured relationship, and a specific implementation mode may include but is not limited to the following.

The terminal device may determine the time-frequency resource for receiving the power-saving channel/signal according to a relationship between the time-frequency resource of the power-saving channel/signal and one power-saving related configuration.

Or, the terminal device may determine the time-frequency resource for receiving the power-saving channel/signal according to a relationship between the time-frequency resource of the power-saving channel/signal and a combination of at least two power-saving related configurations.

Or, the terminal device may determine the time-frequency resource for receiving the power-saving channel/signal according to a relationship between the time-frequency resource of the power-saving channel/signal and one power-saving related configuration parameter.

Or, the terminal device may determine the time-frequency resource for receiving the power-saving channel/signal according to a relationship between the time-frequency resource of the power-saving channel/signal and a combination of at least two power-saving related configuration parameters. The at least two power-saving related configuration parameters may include at least two parameters belonging to the same power-saving related configuration or at least two parameters belonging to at least two power-saving related configurations.

The solution described in the present disclosure is further described by specific examples below.

1) Example 1

The terminal device may determine the time-frequency resource for receiving the power-saving channel/signal according to a relationship between the time-frequency resource of the power-saving channel/signal and a DRX configuration.

The DRX configuration is a terminal device-specific configuration, and different terminal devices may have different DRX configurations. In this example, after the terminal device is configured with a certain DRX configuration, the time-frequency resource of the corresponding power-saving channel/signal may be determined according to the relationship between the time-frequency resource of the power-saving channel/signal and the DRX configuration. Different DRX configurations may correspond to time-frequency resources of different power-saving channels/signals.

The terminal device may receive the power-saving channels/signals according to the determined time-frequency resource of the power-saving channel/signal, and perform corresponding power-saving control, such as determining whether to wake up in a DRX ON duration according to a PWSS.

2) Example 2

The terminal device may determine the time-frequency resource for receiving the power-saving channel/signal according to a relationship between the time-frequency resource of the power-saving channel/signal and part of parameters in a DRX configuration.

The DRX configuration may include multiple parameters, and preferably, the terminal device may determine the time-frequency resource for receiving the power-saving channel/signal according to a relationship between the time-frequency resource of the power-saving channel/signal and one or any combination of drx-onDurationTimer, drx-StartOffset, drx-ShortCycle and drx-LongCycle parameters in the DRX configuration.

Among them, drx-onDurationTimer is used for configure the duration at the beginning of a DRX cycle, drx-StartOffset is used for configuring the subframe where the DRX cycle starts, drx-ShortCycle is used for configuring the Short DRX cycle, and drx-LongCycle is used for configuring the Long DRX cycle.

For example, the terminal device may determine the time-frequency resource for receiving the power-saving channel/signal according to a relationship between the time-frequency resource of the power-saving channel/signal and a drx-onDurationTimer.

For another example, the terminal device may determine the time-frequency resource for receiving the power-saving channel/signal according to a relationship between the time-frequency resource of the power-saving channel/signal and a combination of drx-StartOffset, drx-ShortCycle and drx-LongCycle.

In addition, if the above parameters corresponding to different terminal devices are the same or similar, then these different terminal devices can share the same power-saving channel/signal.

For example, if the combinations of drx-StartOffset, drx-ShortCycle and drx-LongCycle in DRX configurations of different terminal devices are the same or similar, the time-frequency resource of the same power-saving channel/signal can be associated, for example, time-frequency resources of a same PWSS are associated. In other words, if the combinations of drx-StartOffset, drx-ShortCycle and drx-LongCycle in the DRX configurations of the different terminal devices are the same or similar, the same PWSS may be shared to indicate whether it is needed to wake up for performing a downlink reception in a DRX on duration, for example, to wake up at a time point close to the DRX on duration to receive a PWSS for determining whether to wake up in the DRX on duration. If the combinations of drx-StartOffset, drx-ShortCycle and drx-LongCycle in the DRX configurations of the different terminal devices are much different, patterns of DRX on duration for downlink reception by these different terminal devices are also much different, therefore the same PWSS is not suitable to be shared. The above similarity usually means that a deviation is within a predetermined range.

3) Example 3

The terminal device may determine the time-frequency resource for receiving the power-saving channel/signal according to a relationship between the time-frequency resource of the power-saving channel/signal and a BWP configuration.

After the terminal device switches to a specific BWP, it can receive the corresponding power-saving channel/signal according to a time-frequency resource of a power-saving channel/signal associated with the BWP, and the corresponding power-saving channel/signal may be used for performing a power-saving control operation on the BWP, such as related control of DRX, PDCCH reception, processing time, antenna configuration, etc.

4) Example 4

The terminal device may determine the time-frequency resource for receiving the power-saving channel/signal according to a relationship between the time-frequency resource of the power-saving channel/signal and a PDCCH searchSpace configuration.

For example, different search space IDs (identifiers) may be associated with time-frequency resources of different power-saving channels/signals.

5) Example 5

The terminal device may determine the time-frequency resource for receiving the power-saving channel/signal according to a relationship between the time-frequency resource of the power-saving channel/signal and part of parameters in a PDCCH searchSpace configuration.

The PDCCH searchSpace configuration may include multiple parameters. Preferably, the terminal device may determine the time-frequency resource for receiving the power-saving channel/signal according to a relationship between the time-frequency resource of the power-saving channel/signal and one or a combination of parameters of monitoringSlotperiodicityandoffset and duration in the PDCCH searchSpace configuration. The above parameters are used for configuring a listening period, a duration and an offset of a searchSpace, etc.

If the above parameters corresponding to different terminal devices are the same or similar, then these different terminal devices can share the same power-saving channel/signal.

For example, if the combinations of MonitoringLotperiodicityandoffsets and durations in PDCCH searchSpace configurations of different terminal devices are the same or similar, then these terminal devices can share the same power-saving channel/signal, such as PWSS and/or GTS, to indicate whether to conduct PDCCH monitoring.

6) Example 6

The terminal device may determine the time-frequency resource for receiving the power-saving channel/signal according to a relationship between the time-frequency resource of the power-saving channel/signal and a PDCCH CORSET (ControlResourceSet) configuration.

For example, different ControlResourceSetsIDs may be associated with different power-saving channels/signals.

7) Example 7

The terminal device may determine the time-frequency resource for receiving the power-saving channel/signal according to a relationship between the time-frequency resource of the power-saving channel/signal and part of parameters in a PDCCH CORSET configuration.

The PDCCH CORSET configuration may include multiple parameters. Preferably, the terminal device may determine the time-frequency resource for receiving the power-saving channel/signal according to a relationship between the time-frequency resource of the power-saving channel/signal and one or a combination of parameters of frequencyDomainResources and duration in the PDCCH CORSET configuration.

If the above parameters corresponding to different terminal devices are the same or similar, then these different terminal devices can share the same power-saving channel/signal.

For example, if the combinations of frequencyDomainResources and durations in PDCCH searchSpace configurations of different terminal devices are the same or similar, then these terminal devices can share the same power-saving channel/signal, such as PWSS and/or GTS.

8) Example 8

The terminal device may determine the time-frequency resource for receiving the power-saving channel/signal according to a relationship between the time-frequency resource of the power-saving channel/signal and a CSI-report configuration (CSI-ReportConfig).

For example, different CSI-ReportConfigIDs may be associated with time-frequency resources of different power-saving channels/signals. The power-saving channels/signals may be used for controlling whether a CSI needs to be fed back at a certain CSI feedback opportunity, etc.

9) Example 9

The terminal device may determine the time-frequency resource for receiving the power-saving channel/signal according to a relationship between the time-frequency resource of the power-saving channel/signal and part of parameters in a CSI-ReportConfig configuration.

The CSI-ReportConfig configuration may contain multiple parameters, and preferably, the terminal device may determine the time-frequency resource for receiving the power-saving channel/signal according to a relationship between the time-frequency resource of the power-saving channel/signal and the parameter CSI-ReportPeriodicityAndOffset in the CSI-ReportConfig configuration. The above parameters are used for configuring a period and an offset of a CSI report.

In addition, if the above parameters corresponding to different terminal devices are the same or similar, then these different terminal devices can share the same power-saving channel/signal.

10) Example 10

The terminal device may determine the time-frequency resource for receiving the power-saving channel/signal according to a relationship between the time-frequency resource of the power-saving channel/signal and an RRM measurement configuration (MeasConfig).

For example, different MeasConfigIDs may be associated with time-frequency resources of different power-saving channels/signals. The power-saving channels/signals may be used for controlling whether a measurement is needed at a certain measurement time, or changing a measurement configuration or parameter of the terminal device.

11) Example 11

The terminal device may determine the time-frequency resource for receiving the power-saving channel/signal according to a relationship between the time-frequency resource of the power-saving channel/signal and part of parameters in a MeasConfig configuration.

The MeasConfig configuration may contain multiple parameters. Preferably, the terminal device may determine the time-frequency resource for receiving the power-saving channel/signal according to a relationship between the time-frequency resource of the power-saving channel/signal and one or a combination of parameters of measGapConfig and s-MeasureConfig in the MeasConfig configuration. The measGapConfig is used for configuring a period, a length, an offset or the like of a measurement gap, and the s-MeasureConfig is used for configuring a measurement threshold for determining whether to measure a non-serving cell.

In addition, if the above parameters corresponding to different terminal devices are the same or similar, then these different terminal devices can share the same power-saving channel/signal.

For example, if the combinations of measGapConfig and s-MeasureConfig in MeasConfig configurations of different terminal devices are the same or similar, then these terminal devices can share the same power-saving channel/signal.

12) Example 12

The terminal device may determine the time-frequency resource for receiving the power-saving channel/signal according to a relationship between the time-frequency resource of the power-saving channel/signal and a combination of a DRX configuration and a BWP configuration.

13) Example 13

The terminal device may determine the time-frequency resource for the receiving power-saving channel/signal according to a relationship between the time-frequency resource of the power-saving channel/signal and a combination of monitoringSlotPeriodicityAndOffset and frequencyDomainResources.

The power-saving channel/signal described in the present disclosure may include a PDCCH, a reference signal or a sequence-based signal, etc. Accordingly, determining the time-frequency resource for receiving the power-saving channel/signal according to the relationship may include determining a searchSpace or Control Resource Set of the PDCCH, or determining a time-frequency resource configuration of the reference signal or the sequence-based signal, etc.

The solution of the present disclosure described above is mainly explained from the terminal device side. For the network side, the network side may configure a power-saving related configuration, and there is a relationship between the power-saving related configuration or the power-saving related configuration parameter and the time-frequency resource of the power-saving channel/signal, wherein the relationship is used for determining the time-frequency resource for receiving the power-saving channel/signal.

The network side may also configure the time-frequency resource of the power-saving channel/signal and the relationship. An object of the configuration may be the terminal device, and the terminal device may determine the time-frequency resource for receiving the power-saving channel/signal according to the configuration.

The above relationship may include but is not limited to:

a relationship between the time-frequency resource of the power-saving channel/signal and one power-saving related configuration; or a relationship between the time-frequency resource of the power-saving channel/signal and a combination of at least two power-saving related configurations; or a relationship between the time-frequency resource of the power-saving channel/signal and one power-saving related configuration parameter; or a relationship between the time-frequency resource of the power-saving channel/signal and a combination of at least two power-saving related configuration parameters, wherein the at least two power-saving related configuration parameters may include at least two parameters belonging to a same power-saving related configuration or at least two parameters belonging to at least two power-saving related configurations.

Among them, the power-saving related configuration may include a DRX configuration, and/or a BWP configuration, and/or a PDCCH CORSET configuration, and/or a PDCCH searchSpace configuration, and/or a MIMO configuration, and/or a MIMO layers configuration, and/or an antenna configuration, and/or a CSI report configuration, and/or an RRM measurement configuration, etc.

The power-saving related configuration parameter may include part of parameters in a DRX configuration, and/or part of parameters in a PDCCH CORSET configuration, and/or part of parameters in a PDCCH searchSpace configuration, and/or part of parameters in a CSI report configuration, and/or part of parameters in an RRM measurement configuration, etc.

The power-saving channel/signal may include a PDCCH, a reference signal or a sequence-based signal, etc.

It should be noted that for the sake of brief description, the aforementioned method implementations are expressed as combinations of a series of actions, while those skilled in the art should know that the present disclosure is not limited by the sequence of the described actions, according to the present disclosure, some acts may be performed in other sequences or simultaneously. Secondly, those skilled in the art should also know that the implementations described in the specification are all preferred implementations, and the actions and the modules involved are not necessarily essential to the present disclosure.

In the above-described implementations, the description of each implementation has its own emphasis, and for a part which is not described in detail in a certain implementation, related descriptions in other implementations may be referred to.

In general, by adopting the solution described in the present disclosure, the terminal device can determine the time-frequency resource for receiving the power-saving channel/signal according to the relationship between the power-saving related configuration or the power-saving related configuration parameter and the time-frequency resource of the power-saving channel/signal, so that the terminal device can accurately receive the power-saving channel/signal and realize an effective power-saving control.

In addition, in the prior art, a power-saving channel/signal, such as a PWSS, is a cell-level or terminal device group-level signal, and is used for controlling the power saving of terminal devices in a cell or part of terminal devices in a cell. However, it is difficult for a configured PWSS to match power-saving operations of a terminal device which are changed due to a change of traffic volume, for example, a DRX configuration or part of parameters in the DRX configuration of the terminal device are changed due to a change of traffic volume, thus it is difficult for the base station to control the power-saving of the terminal device group accurately through the PWSS. By adopting the solution described in the present disclosure, terminal devices with the same or similar power-saving configuration can share the same power-saving channel/signal, that is, the terminal devices with the same or similar power-saving configuration can be taken as a group for power-saving control, thereby improving the accuracy of control results, etc.

The above is the description of method implementations, and the solution of the present disclosure will be further described below by apparatus implementations.

Figure 4:
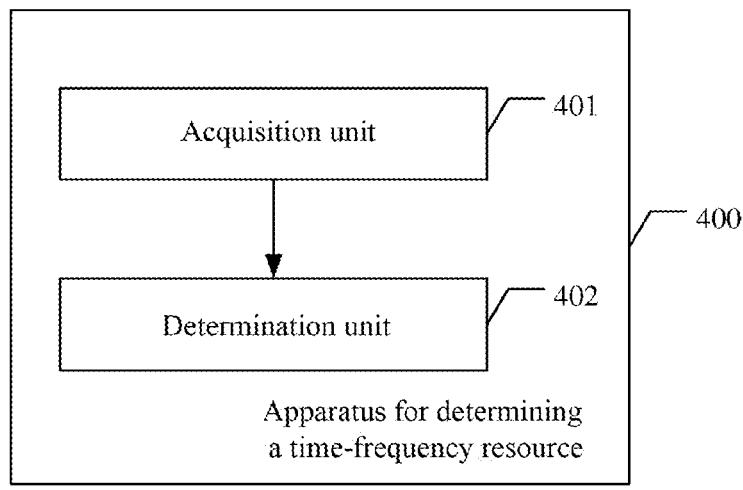
FIG. 4 is a first schematic diagram of a structure of an apparatus 400 for determining a time-frequency resource according to an implementation of the present disclosure.

FIG. 4 is a first schematic diagram of a structure of an apparatus 400 for determining a time-frequency resource according to an implementation of the present disclosure. The apparatus can be applied to a terminal device, as shown in FIG. 4, and includes an acquisition unit 401 and a determination unit 402.

The acquisition unit 401 is configured to acquire a power-saving related configuration.

The determination unit 402 is configured to determine a time-frequency resource for receiving a power-saving channel/signal according to a relationship between the power-saving related configuration or a power-saving related configuration parameter and the time-frequency resource of the power-saving channel/signal.

Preferably, the power-saving related configuration may include a DRX configuration, and/or a BWP configuration, and/or a PDCCH CORSET configuration, and/or a PDCCH searchSpace configuration, and/or a MIMO configuration, and/or a MIMO layers configuration, and/or an antenna configuration, and/or a CSI report configuration, and/or an RRM measurement configuration, etc.

The acquisition unit 401 may also acquire the time-frequency resource of the power-saving channel/signal in addition to the power-saving related configuration. There is a relationship between the power-saving related configuration or the power-saving related configuration parameter and the time-frequency resource of the power-saving channel/signal, and the relationship may be acquired by the acquisition unit.

Preferably, the power-saving related configuration parameter may include part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration, etc.

The determination unit 402 may determine the time-frequency resources for receiving the power-saving channel/signal according to the configured relationship.

The relationship may include, but is not limited to:

a relationship between the time-frequency resource of the power-saving channel/signal and one power-saving related configuration; or a relationship between the time-frequency resource of the power-saving channel/signal and a combination of at least two power-saving related configurations; or a relationship between the time-frequency resource of the power-saving channel/signal and one power-saving related configuration parameter; or a relationship between the time-frequency resource of the power-saving channel/signal and a combination of at least two power-saving related configuration parameters, wherein the at least two power-saving related configuration parameters may include at least two parameters belonging to a same power-saving related configuration or at least two parameters belonging to at least two power-saving related configurations.

The above power-saving channel/signal may include a PDCCH, a reference signal or a sequence-based signal, etc. Accordingly, the determination unit 402 may determine a searchSpace or Control Resource Set of the PDCCH, or determine a time-frequency resource configuration of the reference signal or the sequence-based signal.

Figure 5:
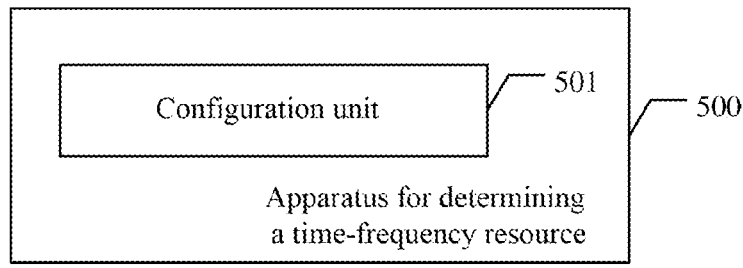
FIG. 5 is a second schematic diagram of a structure of an apparatus 500 for determining a time-frequency resource according to an implementation of the present disclosure.

FIG. 5 is a second schematic diagram of a structure of an apparatus 500 for determining a time-frequency resource according to an implementation of the present disclosure. The apparatus may be applied to a network side, as shown in FIG. 5, and includes a configuration unit 501.

The configuration unit 501 is configured to configure a power-saving related configuration, wherein there is a relationship between the power-saving related configuration or a power-saving related configuration parameter and a time-frequency resource of a power-saving channel/signal, and the relationship is used for determining a time-frequency resource for receiving the power-saving channel/signal.

In addition, the configuration unit 501 may also configure the time-frequency resource of the power-saving channel/signal and the above relationship.

The above relationship may include but is not limited to:

a relationship between the time-frequency resource of the power-saving channel/signal and one power-saving related configuration; or a relationship between the time-frequency resource of the power-saving channel/signal and a combination of at least two power-saving related configurations; or a relationship between the time-frequency resource of the power-saving channel/signal and one power-saving related configuration parameter; or a relationship between the time-frequency resource of the power-saving channel/signal and a combination of at least two power-saving related configuration parameters, wherein the at least two power-saving related configuration parameters may include at least two parameters belonging to a same power-saving related configuration or at least two parameters belonging to at least two power-saving related configurations.

Among them, the power-saving related configuration may include a DRX configuration, and/or a BWP configuration, and/or a PDCCH CORSET configuration, and/or a PDCCH searchSpace configuration, and/or a MIMO configuration, and/or a MIMO layers configuration, and/or an antenna configuration, and/or a CSI report configuration, and/or an RRM measurement configuration, etc.

The power-saving related configuration parameter may include part of parameters in a DRX configuration, and/or part of parameters in a PDCCH CORSET configuration, and/or part of parameters in a PDCCH searchSpace configuration, and/or part of parameters in a CSI report configuration, and/or part of parameters in an RRM measurement configuration, etc.

The power-saving channel/signal may include a PDCCH, a reference signal or a sequence-based signal, etc.

For specific working modes of the apparatus implementations shown in FIG. 4 and FIG. 5, reference may be made to relevant description in the aforementioned method implementations, which will not be repeated.

Figure 6:
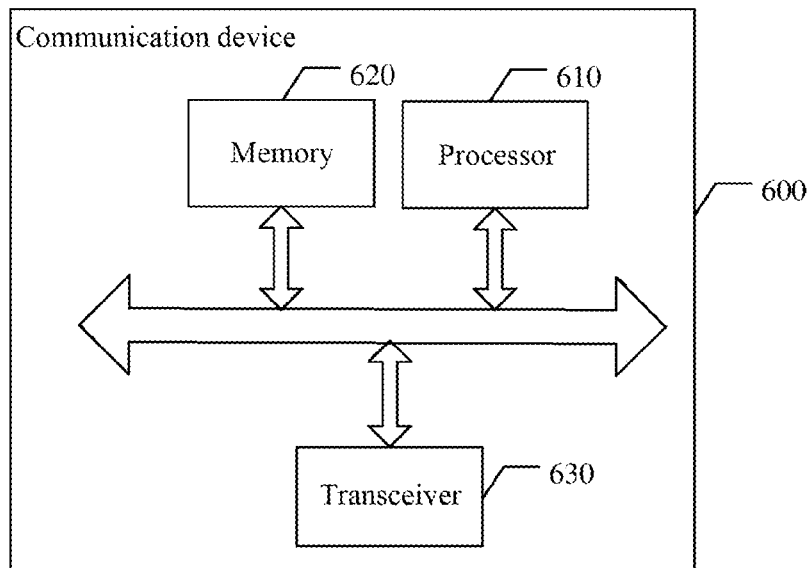
FIG. 6 is a schematic diagram of a structure of a communication device 600 according to an implementation of the present disclosure.

FIG. 6 is a schematic diagram of a structure of a communication device 600 according to an implementation of the present disclosure. The communication device 600 shown in FIG. 6 includes a processor 610. The processor 610 may call and run a computer program from a memory 620 to implement a method in an implementation of the present disclosure.

Optionally, as shown in FIG. 6, the communication device 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with another device. Specifically, the transceiver 830 may send information or data to another device or receive information or data sent by another device.

The transceiver 630 may include a transmitter and a receiver. The transceiver 630 may further include antennas, and the number of antennas may be one or more.

Optionally, the communication device 600 may be the network device of an implementation of the present disclosure, and the communication device 600 may implement the corresponding processes implemented by the network device in various methods of the implementations of the present disclosure, which will not be repeated here for brevity.

Optionally, the communication device 600 may be specifically a mobile terminal/terminal device of an implementation of the present disclosure, and the communication device 600 may implement the corresponding processes implemented by the mobile terminal/terminal device in various methods of the implementations of the present disclosure, which will not be repeated here for brevity.

Figure 7:
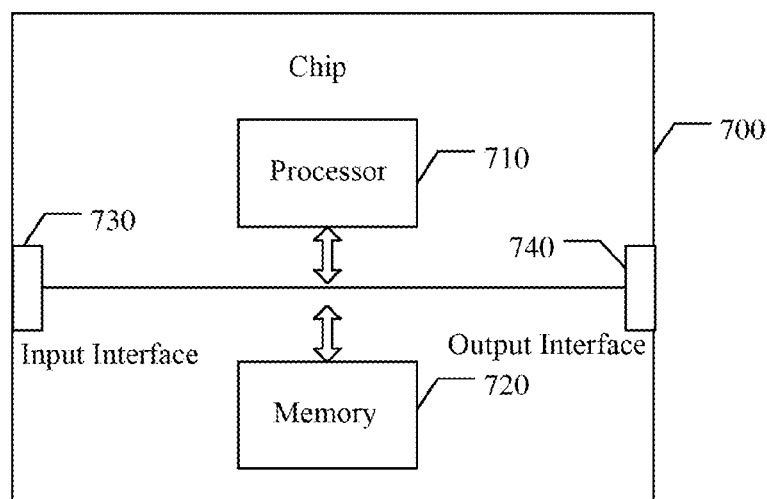
FIG. 7 is a schematic diagram of structure of a chip 700 according to an implementation of the present disclosure.

FIG. 7 is a schematic diagram of structure of a chip 700 according to an implementation of the present disclosure. A chip 700 shown in FIG. 7 includes a processor 710. The processor 710 may call and run a computer program from a memory to implement a method in an implementation of the present disclosure.

Optionally, as shown in FIG. 7, the chip 700 may further include a memory 720. The processor 710 may call and run a computer program from the memory 720 to implement a method in an implementation of the present disclosure.

The memory 720 may be a separate device independent of the processor 710 or may be integrated in the processor 710.

Optionally, the chip 700 may further include an input interface 730. The processor 710 may control the input interface 730 to communicate with another device or chip. Specifically, the processor may acquire information or data sent by another device or chip.

Optionally, the chip 700 may further include an output interface 740. The processor 710 may control the output interface 740 to communicate with another device or chip. Specifically, the processor may output information or data to another device or chip.

Optionally, the chip may be applied to the network device of an implementation of the present disclosure, and the chip may implement the corresponding processes implemented by the network device in various methods of the implementations of the present disclosure, which will not be repeated here for brevity.

Optionally, the chip may be applied to a mobile terminal/terminal device of an implementation of the present disclosure, and the chip may implement the corresponding processes implemented by the mobile terminal/terminal device in various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 8:
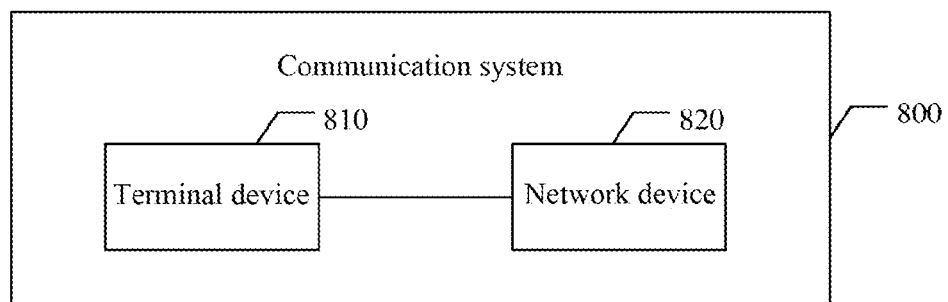
FIG. 8 is a schematic block diagram of a communication system 800 according to an implementation of the present disclosure.

FIG. 8 is a schematic block diagram of a communication system 800 according to an implementation of the present disclosure. As shown in FIG. 8, the communication system 800 may include a terminal device 810 and a network device 820.

The terminal device 810 may be configured to implement the corresponding functions implemented by the terminal device in the above-mentioned method, and the network device 820 may be configured to implement the corresponding functions implemented by the network device in the above-mentioned method, which will not be repeated here for brevity.

It should be understood that, the processor in the implementations of the present disclosure may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform methods, acts and logical block diagrams disclosed in the implementations of the present disclosure. The general purpose processor may be a microprocessor, or the processor may be any conventional processor or the like. The acts of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above methods in combination with its hardware.

It may be understood that, the memory in the implementations of the present disclosure may be a volatile memory or a non-volatile memory, or may include both a volatile memory and a non-volatile memory. The non-transitory memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories in the systems and methods described in this specification are intended to include, but are not limited to, these and any memory of another proper type.

An implementation of the present disclosure further provides a computer-readable storage medium configured to store a computer program.

Optionally, the computer readable storage medium may be applied to a network device in an implementation of the present disclosure, and the computer program enables a computer to perform the corresponding processes implemented by the network device in various methods of the implementations of the present disclosure, which will not be repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device in an implementation of the present disclosure, and the computer program instructions enable a computer to perform the corresponding processes implemented by the network device in various methods of the implementations of the present disclosure, which will not be repeated here for brevity.

Optionally, the computer program product may be applied to a mobile terminal/terminal device in an implementation of the present disclosure, and the computer program instructions enable a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to a network device in an implementation of the present disclosure. When the computer program is run on a computer, the computer is enabled to perform the corresponding processes implemented by the network device in various methods of the implementations of the present disclosure, which will not be repeated here for brevity.

Optionally, the computer program may be applied to a mobile terminal/terminal device in an implementation of the present disclosure. When the computer program is run on a computer, the computer is enabled to perform the corresponding processes implemented by the mobile terminal/terminal device in various methods of the implementations of the present disclosure, which will not be repeated here for brevity.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present disclosure.

Those skilled in the art may clearly learn that for convenience and conciseness of description, the specific working processes of systems, apparatuses and units described above may refer to the corresponding processes in the method implementations, and this will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection between apparatuses or units through some interface, and may be in electrical, mechanical or other forms.

A unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on such understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various media which may store program codes, such as a USB flash disk, a removable hard disk, a ROM, a RAM, a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for determining a time-frequency resource, comprising:
   acquiring, by a terminal device, a power-saving related configuration, wherein the power-saving related configuration includes a Discontinuous Reception (DRX) configuration; and
   determining, by the terminal device, a time-frequency resource for receiving a power-saving channel/signal according to a relationship between the power-saving related configuration or a power-saving related configuration parameter and the time-frequency resource of the power-saving channel/signal, wherein the power-saving channel/signal is configured to instruct, prior to a DRX duration, the terminal device whether to wake up during the DRX duration,
   wherein the relationship comprises a relationship between the time-frequency resource of the power-saving channel/signal and a combination of at least two power-saving related configuration parameters, wherein the at least two power-saving related configuration parameters comprise at least two parameters belonging to a same power-saving related configuration or at least two parameters belonging to at least two power-saving related configurations.

2. The method of claim 1, wherein the method further comprises: acquiring, by the terminal device, the relationship.

3. The method of claim 1, wherein the method further comprises: acquiring, by the terminal device, the time-frequency resource of the power-saving channel/signal.

4. The method of claim 1, wherein the relationship further comprises:
   a relationship between the time-frequency resource of the power-saving channel/signal and one power-saving related configuration parameter.

5. The method of claim 1, wherein the power-saving related configuration comprises a bandwidth part (BWP) configuration, and/or a physical downlink control channel (PDCCH) control resource set (CORSET) configuration, and/or a PDCCH searchSpace configuration and/or a multiple-input multiple-output (MIMO) configuration, and/or a MIMO layers configuration, and/or an antenna configuration, and/or a channel state information (CSI) report configuration, and/or a radio resource management (RRM) measurement configuration.

6. The method of claim 5, wherein the power-saving related configuration parameter comprises part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration.

7. The method of claim 1, wherein the power-saving channel/signal comprises a physical downlink control channel (PDCCH), a reference signal or a sequence-based signal.

8. A method for determining a time-frequency resource, comprising:
configuring, by a network side, a power-saving related configuration, wherein the power-saving related configuration includes a Discontinuous Reception (DRX) configuration, wherein there is a relationship between the power-saving related configuration or a power-saving related configuration parameter and a time-frequency resource of a power-saving channel/signal, and the relationship is used for determining a time-frequency resource for receiving the power-saving channel/signal, and wherein the power-saving channel/signal is configured to instruct, prior to a DRX duration, a terminal device whether to wake up during the DRX duration,
wherein the relationship comprises a relationship between the time-frequency resource of the power-saving channel/signal and a combination of at least two power-saving related configuration parameters, wherein the at least two power-saving related configuration parameters comprise at least two parameters belonging to a same power-saving related configuration or at least two parameters belonging to at least two power-saving related configurations.

9. The method of claim 8, wherein the method further comprises: configuring, by the network side, the relationship.

10. The method of claim 8, wherein the method further comprises: configuring, by the network side, the time-frequency resource of the power-saving channel/signal.

11. The method of claim 8, wherein the relationship further comprises:
a relationship between the time-frequency resource of the power-saving channel/signal and one power-saving related configuration parameter.

12. The method of claim 8, wherein the power-saving related configuration comprises a bandwidth part (BWP) configuration, and/or a physical downlink control channel (PDCCH) control resource set (CORSET) configuration, and/or a PDCCH searchSpace configuration and/or a multiple-input multiple-output (MIMO) configuration, and/or a MIMO layers configuration, and/or an antenna configuration, and/or a channel state information (CSI) report configuration, and/or a radio resource management (RRM) measurement configuration,
wherein the power-saving related configuration parameter comprises part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration.

13. The method of claim 8, wherein the power-saving channel/signal comprises a physical downlink control channel (PDCCH), a reference signal or a sequence-based signal.

14. An apparatus for determining a time-frequency resource, which is applied to a terminal device and comprises a processor and a memory, wherein the memory is configured to store a computer program, and the processor is configured to call and run the computer program stored in the memory to
acquire a power-saving related configuration, wherein the power-saving related configuration includes a Discontinuous Reception (DRX) configuration; and
determine a time-frequency resource for receiving a power-saving channel/signal according to a relationship between the power-saving related configuration or a power-saving related configuration parameter and the time-frequency resource of the power-saving channel/signal, wherein the power-saving channel/signal is configured to instruct, prior to a DRX duration, the terminal device whether to wake up during the DRX duration,
wherein the relationship comprises a relationship between the time-frequency resource of the power-saving channel/signal and a combination of at least two power-saving related configuration parameters, wherein the at least two power-saving related configuration parameters comprise at least two parameters belonging to a same power-saving related configuration or at least two parameters belonging to at least two power-saving related configurations.

15. The apparatus of claim 14, wherein the processor is further configured to acquire the relationship.

16. The apparatus of claim 14, wherein the processor is further configured to acquire the time-frequency resource of the power-saving channel/signal.

17. The apparatus of claim 14, wherein the relationship further comprises:
a relationship between the time-frequency resource of the power-saving channel/signal and one power-saving related configuration parameter.

18. The apparatus of claim 14, wherein the power-saving related configuration comprises a bandwidth part (BWP) configuration, and/or a physical downlink control channel (PDCCH) control resource set (CORSET) configuration, and/or a PDCCH searchSpace configuration and/or a multiple-input multiple-output (MIMO) configuration, and/or a MIMO layers configuration, and/or an antenna configuration, and/or a channel state information (CSI) report configuration, and/or a radio resource management (RRM) measurement configuration,
wherein the power-saving related configuration parameter comprises part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration.

19. The apparatus of claim 14, wherein the power-saving channel/signal comprises a physical downlink control channel (PDCCH), a reference signal or a sequence-based signal.

20. An apparatus for determining a time-frequency resource, which is applied to a network side and comprises a processor and a memory, wherein the memory is configured to store a computer program, and the processor is configured to call and run the computer program stored in the memory to
configure a power-saving related configuration, wherein the power-saving related configuration includes a Discontinuous Reception (DRX) configuration, wherein there is a relationship between the power-saving related configuration or a power-saving related configuration parameter and a time-frequency resource of a power-saving channel/signal, and the relationship is used for determining a time-frequency resource for receiving the power-saving channel/signal, and wherein the power-saving channel/signal is configured to instruct, prior to a DRX duration, the terminal device whether to wake up during the DRX duration, wherein the relationship comprises a relationship between the time-frequency resource of the power-saving channel/signal and a combination of at least two power-saving related configuration parameters, wherein the at least two power-saving related configuration parameters comprise at least two parameters belonging to a same power-saving related configuration or at least two parameters belonging to at least two power-saving related configurations.

21. The apparatus of claim 20, wherein the processor is further configured to configure the relationship.

22. The apparatus of claim 20, wherein the processor is further configured to configure the time-frequency resource of the power-saving channel/signal.

23. The apparatus of claim 20, wherein the relationship further comprises:
a relationship between the time-frequency resource of the power-saving channel/signal and one power-saving related configuration parameter.

24. The apparatus of claim 20, wherein the power-saving related configuration comprises a bandwidth part (BWP) configuration, and/or a physical downlink control channel (PDCCH) control resource set (CORSET) configuration, and/or a PDCCH searchSpace configuration and/or a multiple-input multiple-output (MIMO) configuration, and/or a MIMO layers configuration, and/or an antenna configuration, and/or a channel state information (CSI) report configuration, and/or a radio resource management (RRM) measurement configuration,
wherein the power-saving related configuration parameter comprises part of parameters in the DRX configuration, and/or part of parameters in the PDCCH CORSET configuration, and/or part of parameters in the PDCCH searchSpace configuration, and/or part of parameters in the CSI report configuration, and/or part of parameters in the RRM measurement configuration.

25. The apparatus of claim 20, wherein the power-saving channel/signal comprises a physical downlink control channel (PDCCH), a reference signal or a sequence-based signal.

* * * * *